United States Patent
Jöhr et al.

(10) Patent No.: US 6,505,856 B1
(45) Date of Patent: Jan. 14, 2003

(54) STEERING COLUMN CRASH SYSTEM

(75) Inventors: Hans Jöhr, Kehrsatz; Rudolf Lüthi, Niederwangen; Jürg Oetliker, Ittigen, all of (CH); Kurt Marxer, Nendeln (LI); Markus Marxer, Gamprin (LI); Ronald Meier, Mauren (LI); Christian Lutz, Nuziders (AT)

(73) Assignee: Krupp Presta AG, Eschen (CH)

( * ) Notice: Subject to any disclaimer, the term of this patent is extended or adjusted under 35 U.S.C. 154(b) by 0 days.

(21) Appl. No.: 09/700,377
(22) PCT Filed: May 20, 1999
(86) PCT No.: PCT/CH99/00215
§ 371 (c)(1), (2), (4) Date: Jan. 8, 2001
(87) PCT Pub. No.: WO99/61299
PCT Pub. Date: Dec. 2, 1999

(30) Foreign Application Priority Data

May 22, 1998 (CH) .............................................. 1127/98

(51) Int. Cl.$^7$ ................................................. B62D 1/19
(52) U.S. Cl. ......................................... 280/777; 74/492

(58) Field of Search .................................. 280/777, 779, 280/750, 775; 74/492, 493

(56) References Cited

U.S. PATENT DOCUMENTS 4,978,138 A * 12/1990 Hikone et al. ............... 280/777
6,170,874 B1 * 1/2001 Fosse .......................... 280/777

* cited by examiner

Primary Examiner—Brian L. Johnson
Assistant Examiner—Faye M. Fleming
(74) Attorney, Agent, or Firm—Notaro & Michalos P.C.

(57) ABSTRACT

A steering device for motor vehicles has a steering shaft that is guided by a guide box (3) which is connected to a retaining console and, for example, clamped. The console has at least one sliding surface (8) along the axis of the shaft (1) which allows for a displacement path (20) with respect to the chassis (18) in case of a collision. A clamp (17) is provided for axial retention of the console (6) in an initial position of the displacement path (20). In this way at least one part of the clamped surface is slanted in relation to the vertical clamping device so that the clamping surfaces can move away from each other when the steering shaft is displaced and clamping is reduced.

13 Claims, 4 Drawing Sheets

STEERING COLUMN CRASH SYSTEM

FIELD AND BACKGROUND OF THE INVENTION

Figure 1:
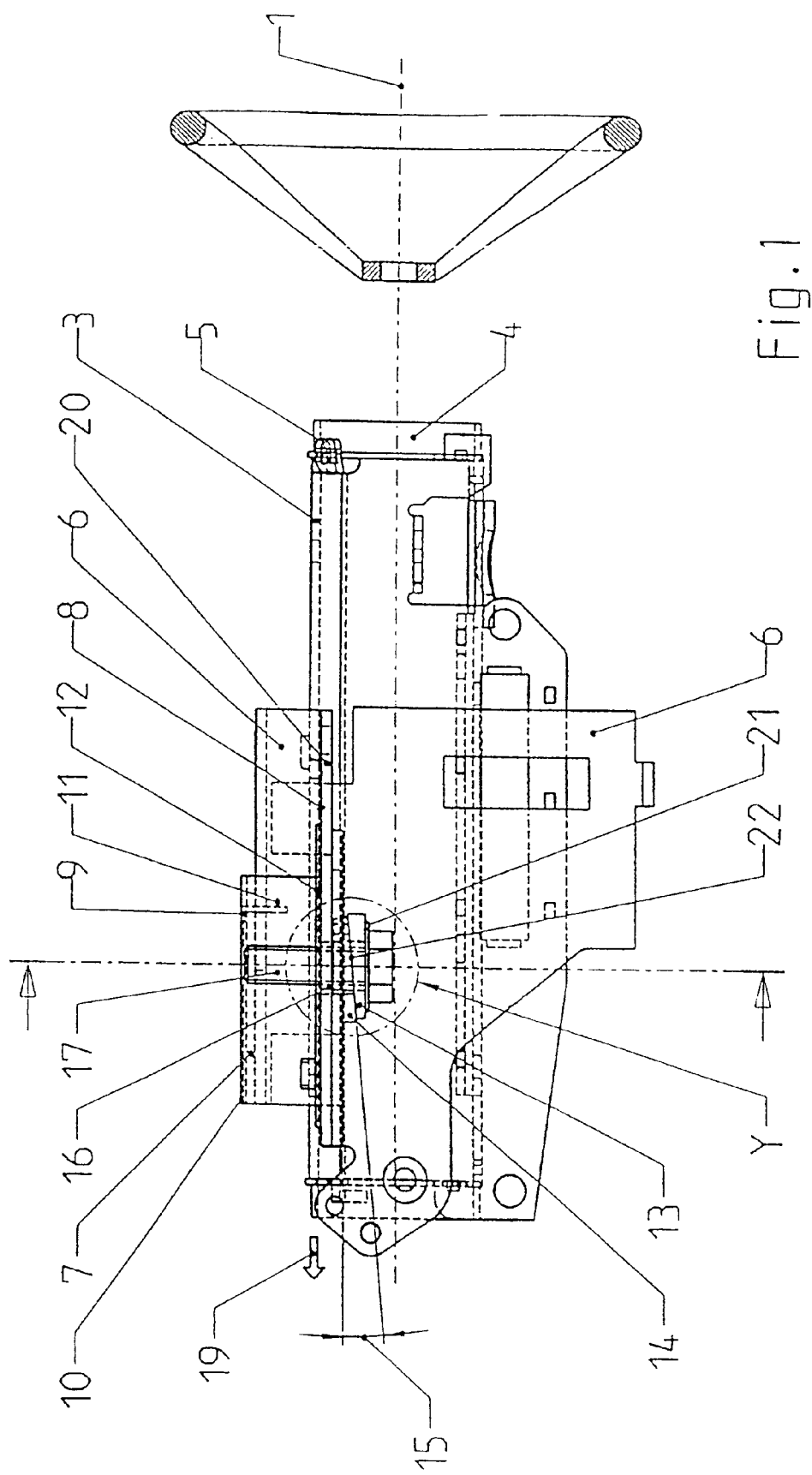

The invention relates to a steering device for motor vehicles with a steering shaft.

Steering devices for motor vehicles are frequently implemented in two parts, one slidable into the other such that in the event of a frontal collision the steering device does not endanger the driver whereby the steering device upon an impact of the body onto the steering wheel yields and the impact energy is absorbed. In the known devices conventionally the slidable steering shaft tube, which receives the control wheel-side steering shaft, is disposed in a casing which is clamped with respect to the motor vehicle chassis by machine screw fastening in predetermined position. The machine screw fastening is herein implemented such that upon impact the steering wheel-side shaft end with the machine screwed casing bracket in the axial direction, in the clamped state is displaceable by a specific path. The impact energy is correspondingly absorbed by the clamping. In order to make the energy absorption more uniform in the event of impact, additional energy absorption elements had been disposed between the longitudinally slidable shaft part and the chassis of the motor vehicle. An energy absorption element, which is implemented as a sheet metal tongue which can be torn away, is for example known from GB 1,390,889.

One disadvantage of the known crash system for steering columns comprises that, on the one hand, the break-free force could not be defined over wide ranges substantially independently of the energy absorption force. The absorption behavior could also not be reproducibly preset.

SUMMARY OF THE INVENTION

The object of the present invention is to propose a crash system for a steering column configuration, which eliminates the disadvantages of the prior art. The object comprises in particular realizing a crash system for steering columns which permits a defined break-free force and a defined energy absorption under reproducible behavior. In addition, the configuration is to be simple to mount and economical in production.

According to the invention the configuration is implemented such that in the event of an impact the break-free force is decoupled from the energy absorption force upon sliding of the steering shaft.

Thus, in the event of a crash the clamping is to be released immediately, for the purpose of which serves a so-called break-free element in order to dissipate the impact energy after the breaking free of the clamping substantially onto an energy absorption element. Therewith is attained that the energy absorption over the defined displacement path is substantially no longer affected by undefined clamping forces and the absorption effect is specifically presettable through the implementation of the absorption element.

For an embodiment of the break-free element, for this purpose in the region of the clamping securement where the high clamping forces between casing bracket and the stationary chassis part occur, the facing portions pressed onto one another through the clamping are slightly inclined with respect to the sliding direction, i.e. disposed at a specific wedge angle such that already with a short displacement path the original clamping is immediately reduced thereby that the two wedge face parts move apart depending on the angular slope. In this way, in the case of an impact the clamping is already broken after a displacement of a few tenths mm and the further displacement is no longer determined by undefined clamping forces. The casing bracket, which fixes the steering shaft tube, is connected with the chassis via a tear-away strip. The implementation of this tear-away strip now determines essentially the degree and the [time] course of the energy absorption behavior. Through appropriate dimensioning of this tear-away flap the energy absorption behavior can be laid out correspondingly optimally gently for the driver.

A further preferred embodiment comprises that in the region of the compressed slide facing elevations are disposed on both sides of the facing, which are staying each other over a short path distance wherewith the slide facing is developed substantially in the short contact zones of the elevations and in the case of displacement, i.e. in the event of a breaking-free, the one elevation slides already after a short path distance, for example of a few millimeters, from the other elevation and thus generates the desired breaking free in the event of a crash. A further especially simple, preferred embodiment of a break-free element comprises that at least on a subregion of the clamped facing parts these opposing clamping faces are [stair]-stepped such that the clamping force is reduced after a short displacement path.

An especially cost-effective and space-saving steering column configuration with crash system for the energy absorption is obtained thereby that the steering shaft is supported in a guide box which, in turn, is fixedly connected with a retaining bracket, comprises laterally flange-like slide faces which, for example, are clamped tightly on the motor vehicle chassis by being machine screwed. The clamping is implemented such that in the event of a crash the steering shaft can be yieldingly displaced for example by several centimeters with the bracket. The energy absorption element is connected, on the one hand, stationarily with the chassis and, on the other hand, connected where the energy absorption takes place via the bracket with the steering shaft. The absorption element is implemented preferably as a sheet metal part with tear-away flap, which, developed, for example, in the form of a yoke as a tear frame, is mounted between the bracket flange and the chassis. This embodiment has the great advantage that the attachment of the configuration on the chassis is possible using only two attachment means, preferably two machine screws. This simplifies the implementation considerably and also permits a rapid mounting which has a positive effect on the total cost. The tightening torque of the machine screws are herein advantageously in the range from 15 to 35 Nm. This highly simple implementation of the configuration and, in particular the feasibility of securing the entire configuration with only two attachment machine screws without separate bracket guidance, permits also in simple application cases the use without the previously described special break-free elements. But in this case the defined separation between break-free force and energy absorption is less unique, but in exchange, the configuration is in this case realizable especially cost-effectively.

BRIEF DESCRIPTIONS OF THE DRAWINGS

Figure 2:
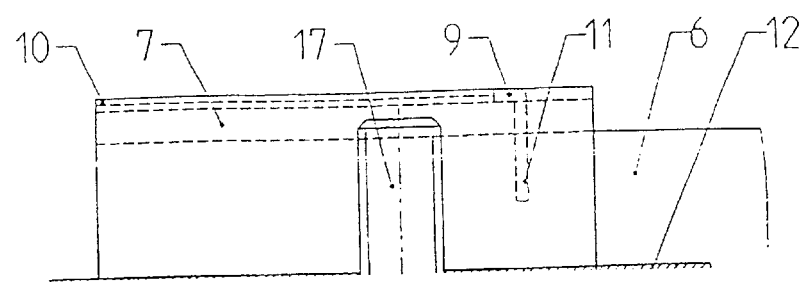
Figure 2A:
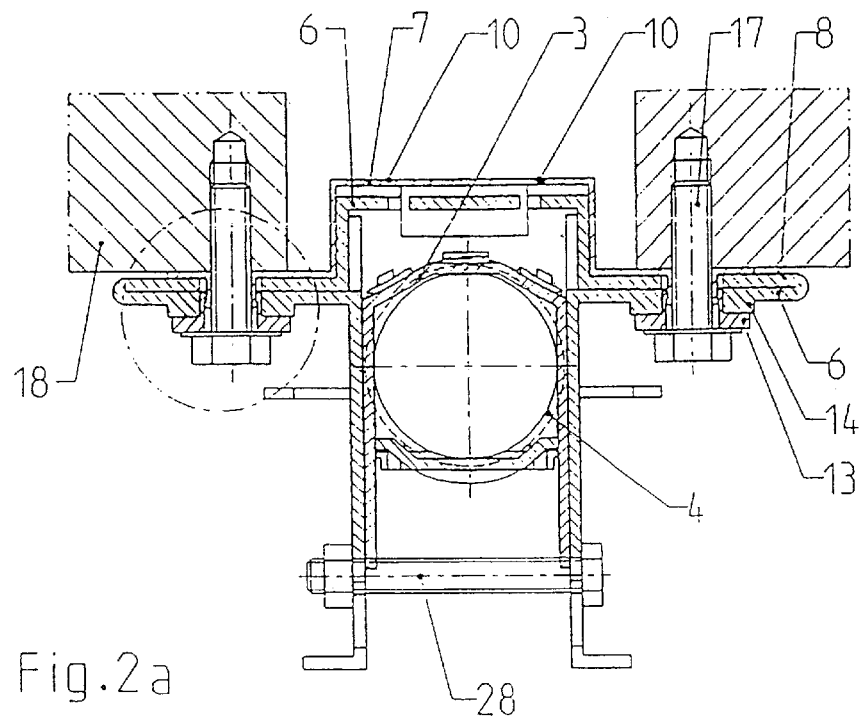
Figure 3A:
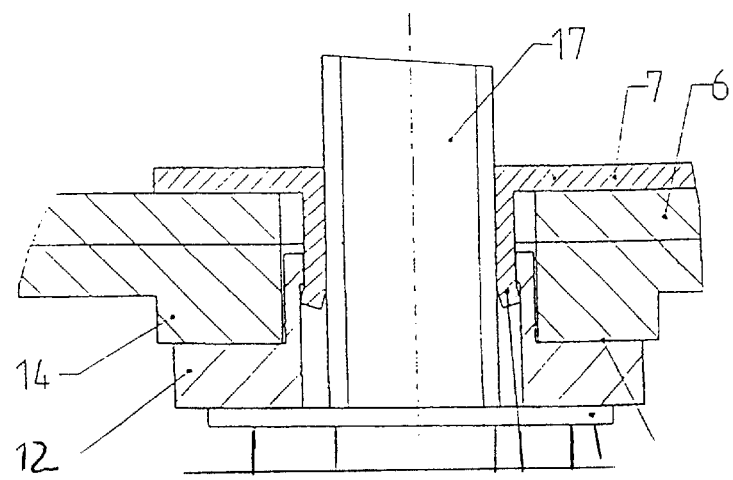
Figure 4:
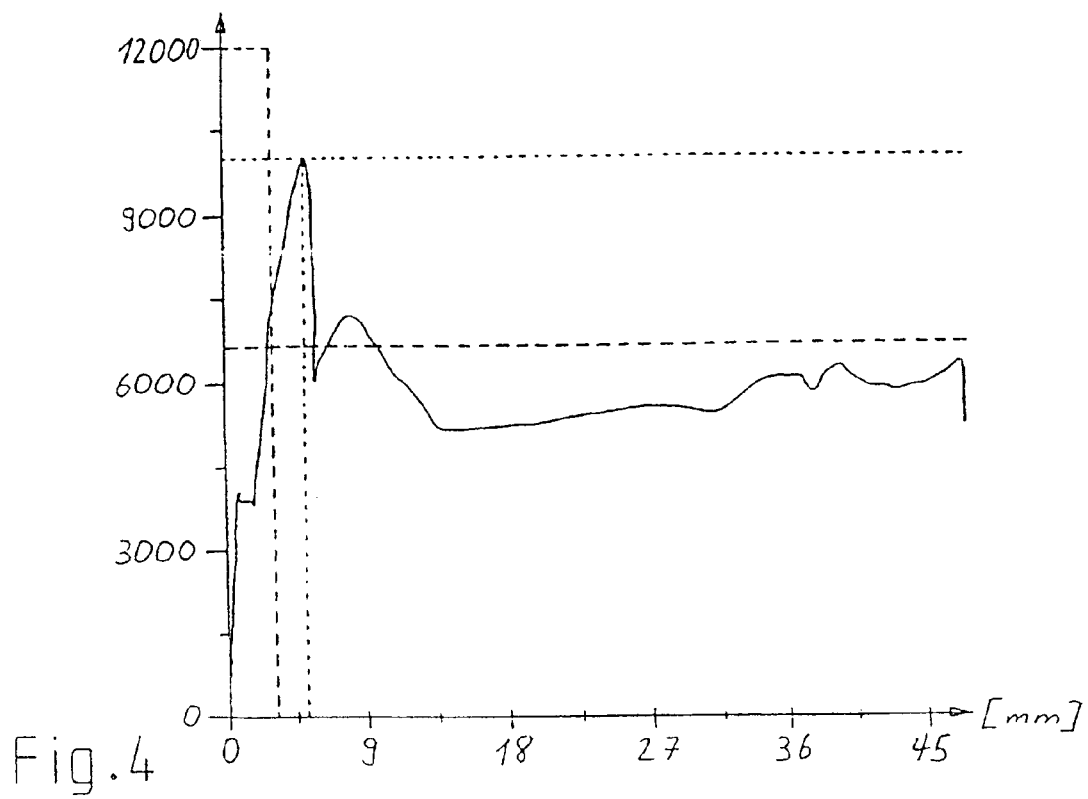
Figure 5:
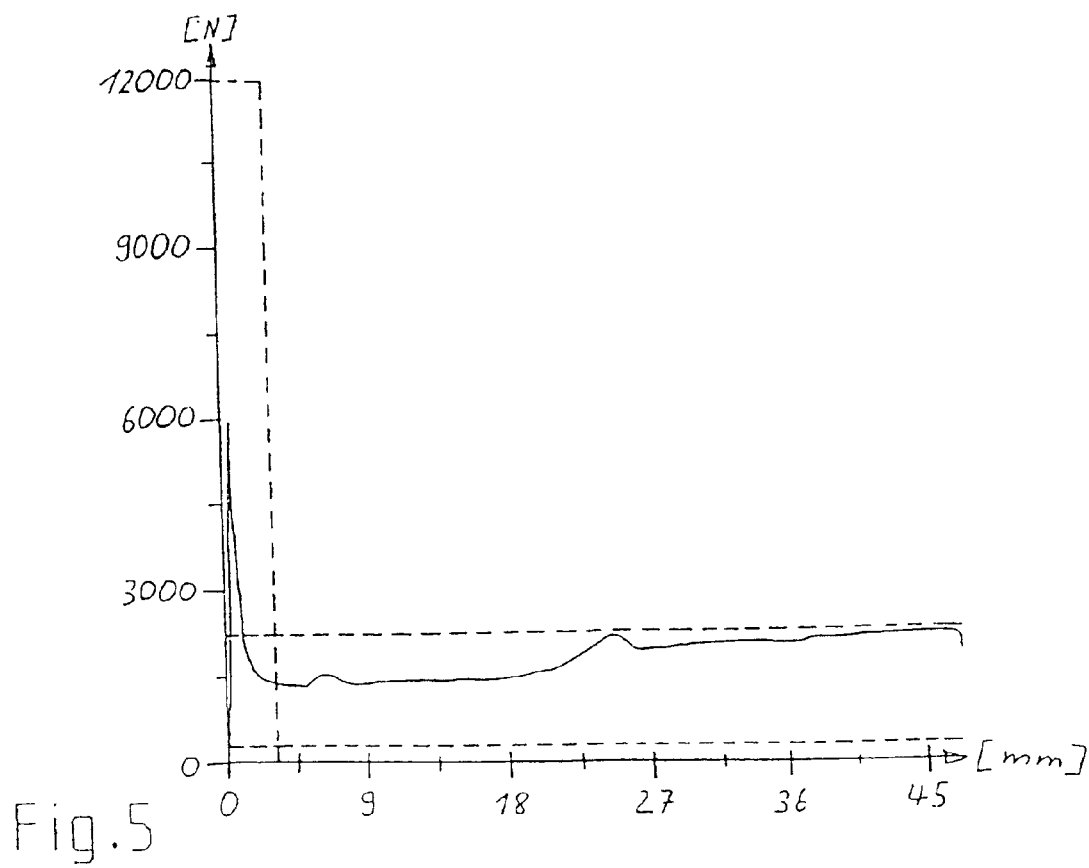
Figure 6:
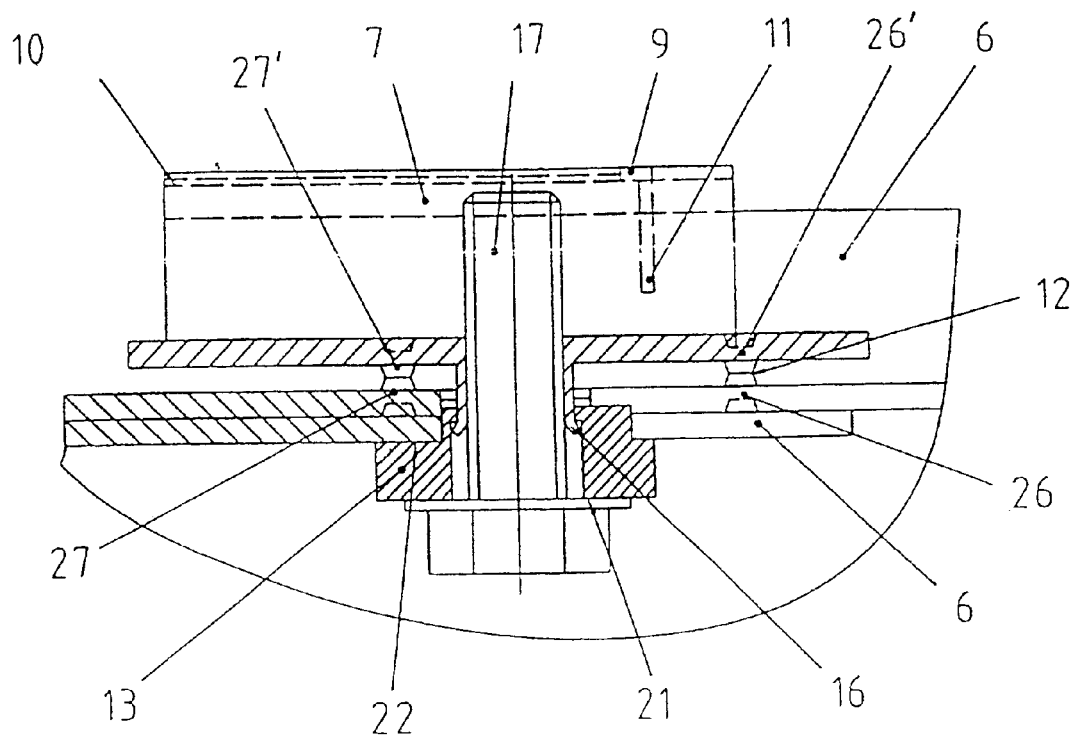
Figure 7:
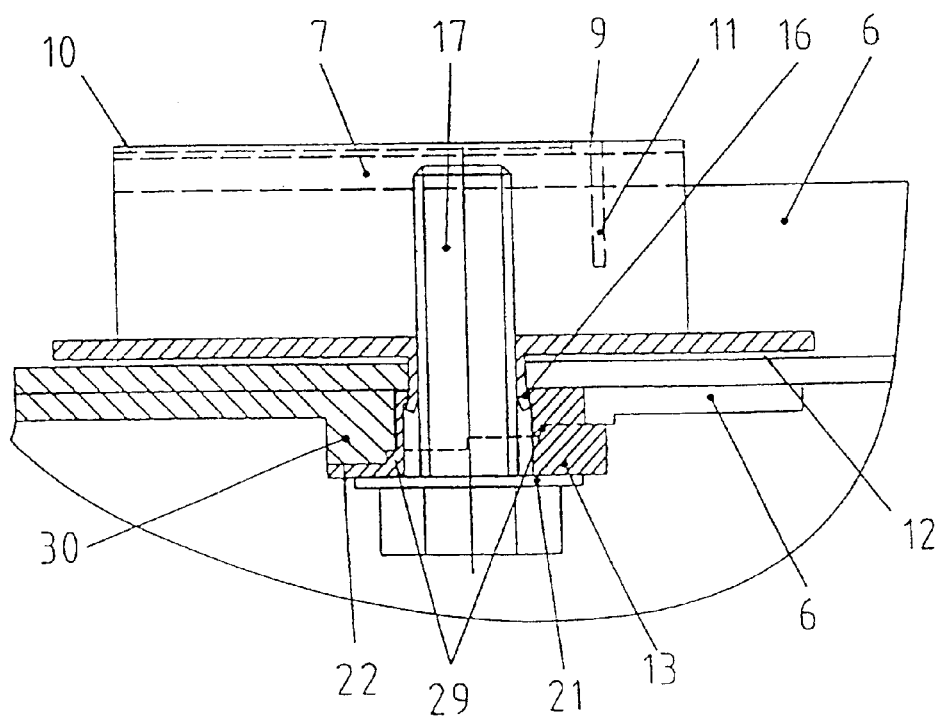

In the following the invention will be explained in further detail in conjunction with embodiment examples with schematic figures. Therein depict:

FIG. 1 a side view of the retaining configuration for steering columns according to the invention, FIG. 2*a* a cross section through the retaining configuration according to FIG. 1, FIG. 2*b* a detailed representation of the clamping securement in cross section, FIG. 3*a* a detailed representation of a clamping facing configuration in longitudinal section with inclined clamping faces, FIG. 3*b* a top view of the clamping configuration in detail according to FIG. 3*a*, FIG. 4 a crash force measurement diagram which shows the behavior according to prior art, FIG. 5 a crash force measurement diagram which shows the behavior according to the invention, FIG. 6 a detailed representation of a further clamping facing configuration in longitudinal section with elevations as spacer elements between the slide faces, FIG. 7 a detailed representation of a further clamping facing configuration in longitudinal section with stair-stepping in the clamping region.

DESCRIPTION OF THE PREFERRED EMBODIMENTS

A steering shaft with the steering shaft axis 1 is connected with a steering wheel 2 and supported in a guide box 3, which, as is shown in FIG. 1, is fixedly connected, for example clamped, with a retaining bracket 6. The guide box 3 can additionally be disposed so as to be height- and/or longitudinally adjustable. The bracket 6, in turn, is secured on the chassis 18 of the motor vehicle. Shaft 1 is implemented telescopingly slidable in the event of a crash, wherewith the bracket 6 for the crash event must also be supported longitudinally displaceable in a range of up to 50 mm with respect to the chassis 18. The bracket 6 is preferably developed U-shaped and at least partially encompasses the guide box 3 to be received. The bearing guide part 4 is for example fixed by retainers 5 between the bracket part 6. On the sides of the bracket 6 are disposed on both sides, for example, slide faces 8, which receive a longitudinal slot 20. This is developed as a running slot and serves for receiving the securement elements 13, 16, 17 as well as bolts or preferably clamping machine screws 17.

Bracket 6 is preferably implemented as a sheet metal part which can be manufactured particularly cost-effectively if it is punched out and implemented as a bent part. Apart from the cost advantage, this has also the advantage that a greater bending strength is possible than is the case, for example, with welded constructions.

Through the clamping machine screws 17 the bracket 6 is screwed tightly on the chassis 18 such that in the event of impact the steering shaft with the guide box 3 is displaceable within the length of the running slot. In order to break free the clamping even with short displacement paths, in the terminal region of the running slot 20 in the initial clamping position the one bracket-side clamping face 22 is implemented as a wedge face 1 inclined at a wedge angle 15. The wedge shoe 13 is preferably developed such that in the event of displacement it slides in the running track 20. Since the clamping faces with respect to the clamping direction are now no longer disposed at an angle of 90°, the immediate breaking free of the clamping force is also possible with short displacement paths. Suitable wedge angles are from 2° to 15°, preferably from 3° to 8°.

The bracket 6 is for example screwed tightly on the chassis 18 for example directly with machine screws 17, wherein the slide shoe 13 is preferably disposed at the screw head side with a washer disk 21. In FIG. 2A the disposition is shown in cross section, from which the preferred manner of securement is depicted on both sides of the shaft axis 1 on chassis 18. The wedge shoe 14 can for example with its wedge face be worked directly into the bracket 6. But it the wedge shoe can be manufactured simpler and more precisely if it is manufactured as a separate disk-form part and is secured on the bracket 6.

The bracket 6 is for example screwed tightly on the chassis 18 for example directly with [machine] screws 17, wherein the slide shoe 13 is preferably disposed at the screw head side with a washer disk 21. In FIG. 2 the disposition is shown in cross section, from which the preferred manner of securement is depicted on both sides of the shaft axis 1 on chassis 18. The wedge shoe 14 can for example with its wedge face be worked directly into the bracket 6. But it [the wedge shoe] can be manufactured simpler and more precisely if it is manufactured as a separate disk-form part and is secured on the bracket 6.

For the defined determination of the energy absorption behavior additionally an energy absorption element 9 is provided which is preferably developed as a sheet metal part with tear-away strip and retaining flap 9. The sheet metal part 7 is advantageously developed as retaining frame 7 which encompasses the U-form bracket 6 in its upper region and is fixed stationarily remaining in the initial position, with the clamping of the bracket 6 on chassis 18. The tear-away flap 9 is provided with advantage in the upper flat metal part, developed in the shape of a U, of the tear frame 7. The tear-away flap 9 is bent as a portion of the tear frame 7 toward the bracket 6 such that the flap 9 can be fixed with respect to the bracket, for example can be clamped or fixed with a welding connection 11. The tear-away strip with retaining flap 9 is disposed between notched tracks 10 and is set through the material thickness of the tear frame metal, through the material strength, as well as through a rolling rotational width with corresponding rolling radius. It is possibly desired, for example by varying the rolling width, to be able to vary the absorption force profile over the path.

The above described constructional implementation of the entire retaining configuration, in which the tear frame 7 is clamped with the slide faces 12 between the bracket flange 6, 8 and the chassis 18, has also particular advantages without the use together with the special break-free elements 13, 14, 22, 26, 27, 29. It permits the simple mounting with cost-effective implementation, good operational behavior and high stability of the configuration, in particular if the configuration, as preferred, is secured with only two machine screws 17 on the chassis 18.

As shown in FIG. 3*a*, the slide shoe 13 is implemented such that a portion of it can slide torsion-tightly in the running slot 20 during the displacement of the bracket 6 relative to the slide shoe 13. The wedge faces 22 between the wedge shoe 14 and the slide shoe 13 herein move apart and the clamping is broken free, wherein then the retaining force or the energy absorption is determined by the tear-away strip.

The tear frame 7 is implemented in the securement region with advantage on both sides as a sheet metal tongue, which is disposed between the chassis 18 and the slide flange face of the bracket 6 and is also clamped by machine screw fastening 17 stationarily relative to the chassis 18. In the event of impact thus the bracket 6 is displaced maximally corresponding to the running slot length 20 together with the wedge shoe 14, which consequently moves away from the stationary slide shoe 13 wherein the tear frame 7 also remains stationary and the tear flap 9, which is fixed on a bracket part 6, is torn away. In order to establish a connection which is free of play between slide shoe 13 and the tear frame 7, the bore in the tear frame 7 is advantageously provided with a crimping 16 such that the slide shoe 13 is guided together with the crimping 16 as is also evident in FIG. 2b. This configuration is shown in top view in FIG. 3b, where the running slot 20 is evident.

A further improvement of the reproducibility of the break-free behavior can be attained thereby that the clamping faces 22, which means the inclined slide shoe face 13 and the wedge shoe face 14 is surface-treated definitively. This can take place, for example thereby that the surfaces are specifically roughened and/or coated and/or also lubricated.

The tightening torque of the clamping screws is advantageously set with torsional moment monitoring in the range from 15 to 35 Nm. In FIG. 4 in a break-free diagram the measured behavior of the break-free force is shown over a path of 45 mm, wherein the machine screw fastening takes place with a torsional moment of 25 Nm. This demonstrates that the break-free force was above 9000 N and only decreases after a relatively long path of approximately 5 mm, but wherein a relatively high residual clamping force effect of approximately 6000 N remains indeterminately until the path of 45 mm has been finished. Under the same measuring conditions in FIG. 5 the behavior according to the invention is shown with a configuration according to FIG. 1. The machine screw fastening was also set with 25 Nm torsional moment. The break-free force reaches 6000 N and immediately decreases steeply and definitively after a path of 1 mm, in order to remain subsequently on a low level with break-free elements with inclined faces below 2000 N uniformly over the entire path of 45 mm. In the configuration according to the invention thus after the short break-free process the absorption energy is determined defined, reproducible and presettable through the absorption element, such as preferably a tear-away flap is preset for example with energy absorption forces of 1200 to 5500 N.

A further highly suitable feasibility for realizing a break-free element, such as is shown in FIG. 6, comprises, for example, disposing between the slide faces 8, 12 elevations 26, 27, in order to retain the slide faces in the initial position at a slight distance of a few tenths of a millimeter up to approximately 3 mm. The elevations 26, 27 are to be disposed on both sides of the slide faces substantially symmetrically such that there where the elevations are clamped onto one another, short slide faces 12 are generated which in the event of displacement, i.e. in the event of a crash, slide off one another and thus reduce in a short distance in the mm range the clamping force effect, wherewith subsequently the energy absorption is assumed definitively by the absorption element 7, 9, 11. Such elevations can be developed, for example, in the manner of knubs and be disposed on both sides in the longitudinal direction of the shaft axis of the screw securement 17. But it is also possible to dispose several knub-like elevations adjacently or successively to one another or further stair-stepped or also on an inclined plane, depending on the requirement of the clamping forces, the friction forces and the display paths, or the dimensioning of the entire configuration. In the present case the slide shoe 13 is realized, for example, as a simple shim. But it is also possible to provide these knub-like formations in the region of the slide shoe 13.

In FIG. 7 a further embodiment extremely advantageous and simple to realize, of a break-free element is shown. In this embodiment the contacting clamped faces of the slide shoe 13 and of the original wedge shoe 14 are not implemented in the form of a wedge but rather are developed in the form of stairs. The step width of the staircase-like development herein defines the break-free path. This embodiment is especially simple and cost-effectively realizable. The above listed various types of the break-free elements can also be used in combination with one another.

The various features of novelty which characterize the invention are pointed out with particularity in the claims and next to and forming a part of this disclosure and are entirely Based on the priority application no. CH 1127/98.

What is claimed is:

1. Steering device for motor vehicles having a chassis, comprising: a steering shaft having a shaft axis; a guide box (3) for guiding the steering shaft; a retaining bracket (6) connected by clamping to the guide box, the bracket having at least one slide face (8) along the shaft axis (1) which permits a displacement path (2) with respect to the chassis (18); clamping means (13, 16, 17) comprising a break-free element (13, 14, 29, 30) with a clamping face (22) in at least one subregion of the initial position, such that with a displacement of the bracket in a shaft axis direction (19), clamping force is decreased; and the bracket (6) being connected via an energy absorber (9, 10) which is stationary relative to the chassis (18), the energy absorber comprising a tear-away flap.

2. A device as claimed in claim 1, wherein the break free element (13, 14, 29, 30) in at least the subregion of the initial position comprises a clamping facing part (13, 14) inclined relative to the slide face (8) and forming a wedge angle (15), the wedge angle (15) being in the range from 2° to 15°.

3. A device as claimed in claim 1, wherein the break-free element (13, 14, 29, 30) comprises a stair-stepped clamping facing (29, 22).

4. A device as claimed in claim 1, wherein the break-free element (13, 14, 29, 30) comprises, between the slide face (8) and the chassis (18), elevations (26, 26', 27, 27') in the initial position disposed pair-wise one above another such that a bracket-side elevation (26, 27) in the event of displacement slides down from a chassis-side elevation (26', 27').

5. A device as claimed in claim 4, wherein at least two elevation pairs (26, 26', 27, 27') are provided and in a direction of the shaft axis (1) the clamping means (17) is disposed in between, wherein the elevations (26, 26', 27, 27') are in the form of nubs, wherein faces (12) between the elevations are inclined.

6. A device as claimed in claim 1, wherein the energy absorber (9, 10) is a tear-away flap (9) which is between a pair of notched tracks (10).

7. A device as claimed in claim 1, wherein the bracket (6) clamps the guide box (3) and comprises on both sides slide faces (8) and means (13, 16, 17) for the clamping securement on the chassis (18).

8. A device as claimed in claim 1, wherein the tear-away flap comprises a slide face (7, 12) disposed between the chassis (18) and the bracket slide face (6, 8).

9. A device as claimed in claim 7, wherein the clamping faces (22) are ring-shaped disks, the upper disk (14) being fixed on the bracket (6) and the lower disk (13) being retained as a slide shoe (13) with the clamping means stationary on the chassis (18).

10. A device as claimed in claim 1, wherein the slide face (8) in the bracket (6) comprises a running slot (20) for guided receiving of parts of the clamping means (16, 17, 13).

11. A device as claimed in claim 1, wherein at least one of the clamping faces (22) is surface-treated.

12. A device as claimed in claim 1, wherein the bracket (6) is a sheet metal part.

13. A device as claimed in claim 1, wherein the energy absorber (9, 10) is a tear frame (7) and is fixed stationarily directly on the chassis (18) with clamping means (17).

* * * * *